US 9,256,706 B2

(12) United States Patent
Chen et al.

(10) Patent No.: US 9,256,706 B2
(45) Date of Patent: Feb. 9, 2016

(54) KNOWLEDGE-BASED ANALOG LAYOUT GENERATOR

(71) Applicant: Synopsys Taiwan Co., Ltd., Taipei (TW)

(72) Inventors: Tung-Chieh Chen, Taipei (TW); Po-Hsun Wu, Taipei (TW); Po-Hung Lin, Chiayi (TW); Tsung-Yi Ho, Taipei (TW)

(73) Assignee: Synopsys Taiwan Co., Ltd., Taipei (TW)

( * ) Notice: Subject to any disclaimer, the term of this patent is extended or adjusted under 35 U.S.C. 154(b) by 0 days.

(21) Appl. No.: 14/476,320

(22) Filed: Sep. 3, 2014

(65) Prior Publication Data

US 2015/0067626 A1   Mar. 5, 2015

Related U.S. Application Data

(60) Provisional application No. 61/873,313, filed on Sep. 3, 2013.

(51) Int. Cl.
*G06F 9/455* (2006.01)
*G06F 17/50* (2006.01)

(52) U.S. Cl.
CPC ........ *G06F 17/5077* (2013.01); *G06F 17/5063* (2013.01); *G06F 17/5072* (2013.01)

(58) Field of Classification Search
CPC ............ G06F 17/5072; G06F 17/5045; G06F 17/5063; G06F 17/50; G06F 17/5068; G06F 17/5077; G06F 17/5081; G06F 2217/12; G06F 2217/74
See application file for complete search history.

(56) References Cited

U.S. PATENT DOCUMENTS

| 7,739,646 B2* | 6/2010 | Lin et al. ................. 716/119 |
| 7,873,928 B2* | 1/2011 | Lin et al. ................. 716/119 |
| 7,992,117 B2* | 8/2011 | Bowen ..................... 716/119 |
| 8,434,037 B2* | 4/2013 | Krishnan .................. 716/107 |
| 2003/0131323 A1* | 7/2003 | McConaghy ................ 716/2 |
| 2007/0006103 A1* | 1/2007 | Zhang et al. ............... 716/1 |
| 2008/0092099 A1* | 4/2008 | Lin et al. ................... 716/8 |
| 2011/0107281 A1* | 5/2011 | Sun et al. .................. 716/106 |
| 2011/0219352 A1* | 9/2011 | Majumder et al. ......... 716/139 |
| 2011/0276936 A1* | 11/2011 | Jiang et al. ................. 716/126 |

* cited by examiner

*Primary Examiner* — Nha Nguyen
(74) *Attorney, Agent, or Firm* — Ardeshir Tabibi, Esq.; Alston & Bird LLP

(57) ABSTRACT

A computer-implemented method for generating a layout of a design includes invoking the computer to receive a schematic representation of the design, generating a connection graph associated with the design, comparing the connection graph with a plurality of connection graphs stored in a database and selecting a layout associated with the matching connection graph in generating the layout of the design.

38 Claims, 14 Drawing Sheets

KNOWLEDGE-BASED ANALOG LAYOUT GENERATOR

CROSS-REFERENCES TO RELATED APPLICATIONS

The present application claims benefit under 35 U.S.C. 119(e) to U.S. Provisional Application No. 61/873,313, filed on Sep. 3, 2013, entitled "Knowledge-Based Analog Layout," the content of which is incorporated by reference in its entirety.

BACKGROUND

The present invention relates to placement and routing of an electronic circuit, and more particularly to a knowledge-based analog layout generation method and system.

Modern system-on-chip (SoC) design often contains both digital and analog circuits. The digital circuit design has been extensively assisted by modern design automation tools, while the analog counterpart is still a manual, time-consuming, and error-prone task because the performance specification of modern analog circuits are becoming increasingly stringent.

Many placement-and-routing methods have been proposed to automatically generate analog layouts while considering various analog layout constraints, such as symmetry, regularity, common centroid, thermal gradient, monotonic current paths, and other general placement constraints. Although these layout constraints are designed to minimize the impact from layout-induced parasitics, the resulting layouts are sometimes unacceptable because manual layouts contain much more experts' knowledge, and designers may have their own layout preferences, which cannot simply be expressed by those layout constraints.

SUMMARY OF THE INVENTION

Embodiments of the present invention provide a method, apparatus and system for generating a layout of a target design. In one embodiment, a computer-implemented method for generating a layout of a target design includes invoking the computer to receive a schematic representation of the design, generating a connection graph associated with the design, comparing the connection graph to a plurality of connection graphs stored in a database to identify a match, and selecting a layout associated with the matching connection graph in generating the layout of the design. The plurality of connection graphs stored in the database and the connection graph of the design can be generated from the schematic representation or a netlist that includes multiple devices each having associated terminals that are connected to each other via a plurality of nets. The method further includes adapting the generated layout to a new technology, verifying the adapted layout, and updating the database with the verified layout.

According to an embodiment, the database may be constructed by calculating interconnection codes between pairs of devices, converting the devices and nets connecting the terminals of the devices to respective nodes and edges, and attaching the interconnection codes to the edges of the connection graph. The interconnection code between a pair of devices is a sum of values of terminal connection indices between the terminals of the pair of devices.

In another embodiment, a computer readable medium having program instructions or program code executable by a processor for generating a layout of a received design includes code for reading in the received design, code for generating a connection graph associated with the received design, code for comparing the connection graph to a plurality of connection graphs stored in a database to identify a match, and code for selecting a layout associated with the matching connection graph in generating the layout of the received design.

In yet another embodiment, a computer system having a database configured to store a plurality of connection graphs is provided to generate a layout of a design. The system is configured to receive a schematic representation of the design, generate a connection graph associated with the design, compare the connection graph to the plurality of connection graphs stored in the database to identify a match, and select a layout associated with the matching connection graph in generating the layout of the design. The system is further configured to adapt the identified pattern to a new technology, verify the adapted pattern, and update the database with the verified pattern. The schematic representation may comprise a plurality of devices and associated terminals connected to each other by a plurality of nets. The system is further configured to calculate interconnection codes between pairs of devices, convert the devices and nets connecting the terminals to respective nodes and edges, and attach the interconnection codes to the edges of the connection graph.

The following detailed description together with the accompanying drawings will provide a better understanding of the nature and advantages of the present invention.

BRIEF DESCRIPTION OF THE DRAWINGS

FIG. 5A illustrates an example of graph isomorphism.

FIG. 5B illustrates an example of sub-graph isomorphism. FIG. 5C illustrates an example of sub-graph identification.

FIG. 9(a) illustrates an example pattern graph (PG).

FIG. 9(b) illustrates the number of contained devices and nets of each vertex in FIG. 9(a).

FIG. 9(c) illustrates the resulting PG by merging G1 and G2.

FIG. 9(d) illustrates the number of contained devices and nets of each vertex in FIG. 9(c).

FIG. 9(e) illustrates the resulting PG by merging G4 and G3 according to an embodiment of the present invention.

FIG. 9(f) illustrates the number of contained devices and nets of each vertex in FIG. 9(e).

DETAILED DESCRIPTION OF THE INVENTION

Figure 1:
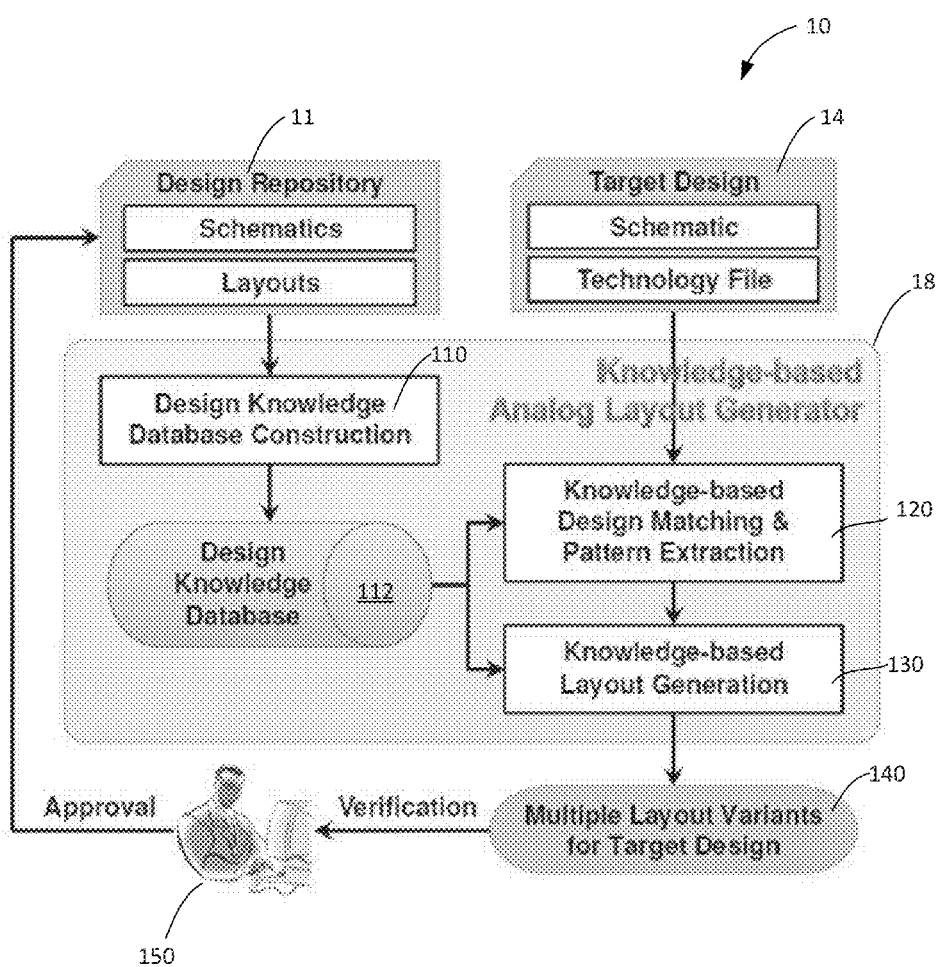
FIG. 1 illustrates a block diagram of a knowledge-based analog layout generation system according to an embodiment of the present invention.

In order to gain more experts' knowledge during analog layout generation, the present invention describes a novel knowledge-based analog layout generator to produce new analog layouts by utilizing the quality-approved legacy layouts in the design repository as much as possible. Embodiments of the present invention may be used in a variety of layout applications. FIG. 1 illustrates a block diagram of a knowledge-based analog layout generation system 10 (referred to as system 10 hereinafter) according to an embodiment of the present invention. System 10 includes a design repository 11 containing a plurality of schematics and a plurality of layouts associated with the schematics, a target design module 14 containing a schematic and associated technology file, and a knowledge-based analog layout generator 18. Knowledge-based analog layout generator 18 illustrated in FIG. 1 includes a design knowledge database construction module 110, a knowledge-based design matching and pattern extraction module 120, and a knowledge-based layout generation module 130. Design knowledge database construction module 110 analyzes the schematics and associated layouts received from design repository 11 and stores the results of the analysis in a design knowledge database 112.

Using design knowledge database 112, knowledge-based design matching and pattern extraction module 120 and a knowledge-based layout generation module 130 then generate multiple layout variants 140 for the target design. Layout variants 140 are verified according to design rules. Layouts that are free of design rule violations may be submitted to experts for approval. The target schematic with the approved layouts is then provided to design repository 11.

System 10 may be constructed on a computer having one or more processing units and system memory devices to perform the functions of design repository 11, target design module 14, knowledge-based analog layout generation module 18, and the verification of the multiple layout variants 140.

Detailed description of the knowledge-based analog layout generation module 18 will be provided below.

Design Knowledge Database Construction

Utilizing a design repository containing legacy design schematics/netlists and the corresponding legacy layouts, the design knowledge database construction analyzes the design data of each circuit and layout, and stores the analyzed data in a design knowledge database. In order to utilize the legacy layouts in the design repository as much as possible when generating the layout of a newly designed circuit, or the target design, the knowledge-based design matching and pattern extraction matches the target design with the legacy design in the design knowledge database, extracts all common sub-circuits, or design patterns, and selects the most suitable ones among the extracted patterns. Finally, the knowledge-based layout generation further extracts the corresponding layout of each design pattern in the database, migrates the extracted layouts to the new technology if it is necessary, and generates target layouts with multiple variants by assembling the migrated layouts of all design patterns. The design knowledge database can be continuously expanded when more and more analog layouts are verified and approved by experienced layout experts.

With the utilization of legacy design in the design repository, the layouts generated by the proposed knowledge-based analog layout generator can keep more experts' knowledge and their layout design preference.

According to embodiments of the present invention, an analog layout is automatically generated from a legacy design data stored in a design repository. Furthermore, a novel algorithm fully or partially matches a target design with a legacy design stored in the design repository, and further identifies or extracts common design patterns.

As the devices/sub-circuits in extracted design patterns are not mutually exclusive, an optimum design pattern is selected from among the extracted patterns while maximizing the re-usage rate of legacy layouts. Embodiments of the present invention formulate the pattern selection problem as a maximum weight clique problem, and propose solution-pruning techniques to reduce the problem size.

Based on the proposed knowledge-based layout design methodology, each designer can maintain his own design repository, and effectively and efficiently generate various target layouts according to his own layout design knowledge.

Given a set of legacy schematics, $S_L$, and legacy layouts, $L_L$, a design knowledge database is first constructed based on a connection graph representation, as described below. Since a basic connection graph can only represent logical information corresponding to a schematic, some important physical information is further annotated from the corresponding legacy layout into the connection graph, as illustrated below.

Connection Graph Generation

Figure 2A:
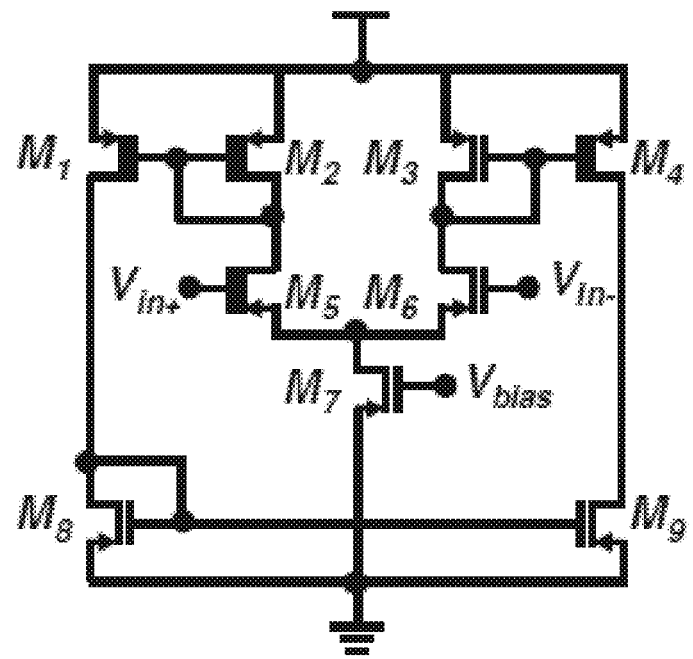
FIG. 2A illustrates an exemplary CMOS cascade operational transconductance amplifier (OTA).

For each legacy schematic, $s_L \text{ Å} S_L$, the corresponding connection graph, $G_{s_L}$, can be derived by converting the devices and nets in $s_L$ to respective nodes and edges. A device type is tagged on each node. If there is a connection between two devices in $s_L$, there is also an edge between the corresponding nodes in $G_{s_L}$. FIG. 2A shows the legacy schematic of an example CMOS cascade operational transconductance amplifier (OTA), which contains four PMOS transistors and five NMOS transistors, and FIG. 2B shows a corresponding connection graph representation of the CMOS cascade OTA in FIG. 2A.

Figure 2B:
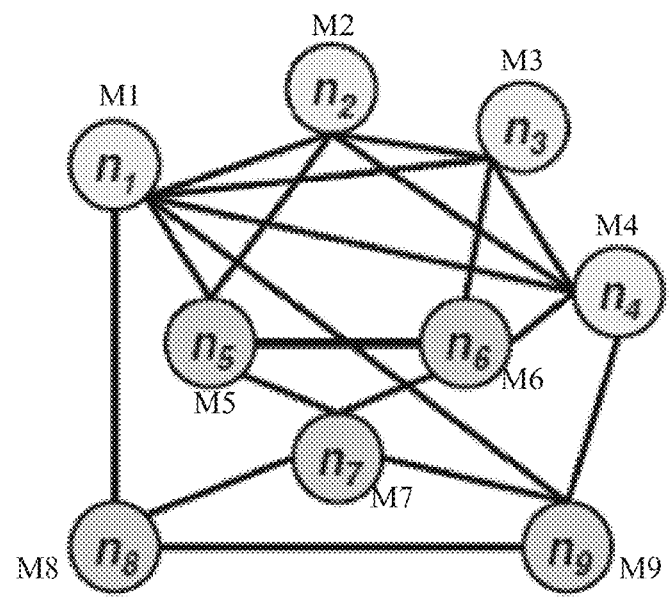
FIG. 2B illustrates the corresponding connection graph representation of FIG. 2A.

Referring to FIG. 2B, node n1 represents PMOS device M1, node n2 represents PMOS device M2, node n3 represents PMOS device M3, and node n4 represents PMOS device M4. Similarly, node n5 represents NMOS device M5, node n6 represents NMOS device M6, node n7 represents NMOS device M7, node n8 represents NMOS device M8, and node n9 represents NMOS device M9.

Since a device in $s_L$ may have two or more terminals, to identify the terminal connections of an edge in $G_{s_L}$, a universal coding scheme is introduced and a code to each edge is attached according to an embodiment of the present invention. Based on the universal coding scheme, each code on an edge uniquely specifies the terminal connections of the edge. For two devices, $d_i$ and $d_j$, which have x and y terminals, respectively, the interconnection code from $d_i$ to $d_j$, $\Gamma i \rightarrow j$, can be calculated by Equation (1), $$\Gamma_{i \rightarrow j} = \sum_{p=1}^{x} \sum_{q=1}^{y} (\alpha_{pq} \times tci_{i \rightarrow j}^{p \rightarrow q}), \quad (1)$$

$$tci^{p \rightarrow q} = 2^{(q+y(p-1)-1)}. \quad (2)$$

where $tci_{i \rightarrow 2}^{p \rightarrow q}$ denotes the terminal connection index (TCI) from the $p^{th}$ terminal of $d_i$ to the $q^{th}$ terminal of device $d_j$, and $\alpha_{pq}\{0, 1\}$. If there is a terminal connection between $t_p$ of $d_i$ and $t_q$ of device $d_j$, $\alpha_{pq}=1$; otherwise, $\alpha pq=0$. The value of $tci^{p \rightarrow q}$ is defined in Equation (2).

Table I lists the terminal connection indices between the terminals of two MOS transistors, $M_i$ and $M_j$, where D, G, and S denote drain, gate, and source terminal, respectively.

TABLE I

| $TCI_{i \rightarrow j}$ | | Terminals of $M_j$ | | |
|---|---|---|---|---|
| | | D | G | S |
| Terminals of $M_i$ | D | 1 | 2 | 4 |
| | G | 8 | 16 | 32 |
| | S | 64 | 128 | 256 |

Based on Table 1, Equation (1), and FIG. 2A, the interconnection codes corresponding to each edge in the connection graph in FIG. 2B can be easily calculated. For example, in FIG. 2A, there are a set of terminal connections from $M_1$ to $M_2$, $TC_{1 \rightarrow 2} = \{tc_{1 \rightarrow 2}^{G \rightarrow D}, tc_{1 \rightarrow 2}^{G \rightarrow G}, tc_{1 \rightarrow 2}^{S \rightarrow S}\}$, where $tc_{1 \rightarrow 2}^{G \rightarrow D}$, $tc_{1 \rightarrow 2}^{G \rightarrow G}$, and $tc_{1 \rightarrow 2}^{S \rightarrow S}$ denote the terminal connection from the gate terminal of $M_1$ to the drain terminal of $M_2$, the terminal connection from the gate terminal of $M_1$ to the gate terminal of $M_2$, and the terminal connection from the source terminal of $M_1$ to the source terminal of $M_2$, respectively. Based on Table 1, $tci_{1 \rightarrow 2}^{G \rightarrow D}=8$, $tci_{1 \rightarrow 2}^{G \rightarrow G}=16$, and $tci_{1 \rightarrow 2}^{S \rightarrow S}=256$, respectively, so $\Gamma_{1 \rightarrow 2}=280$.

Figure 3:
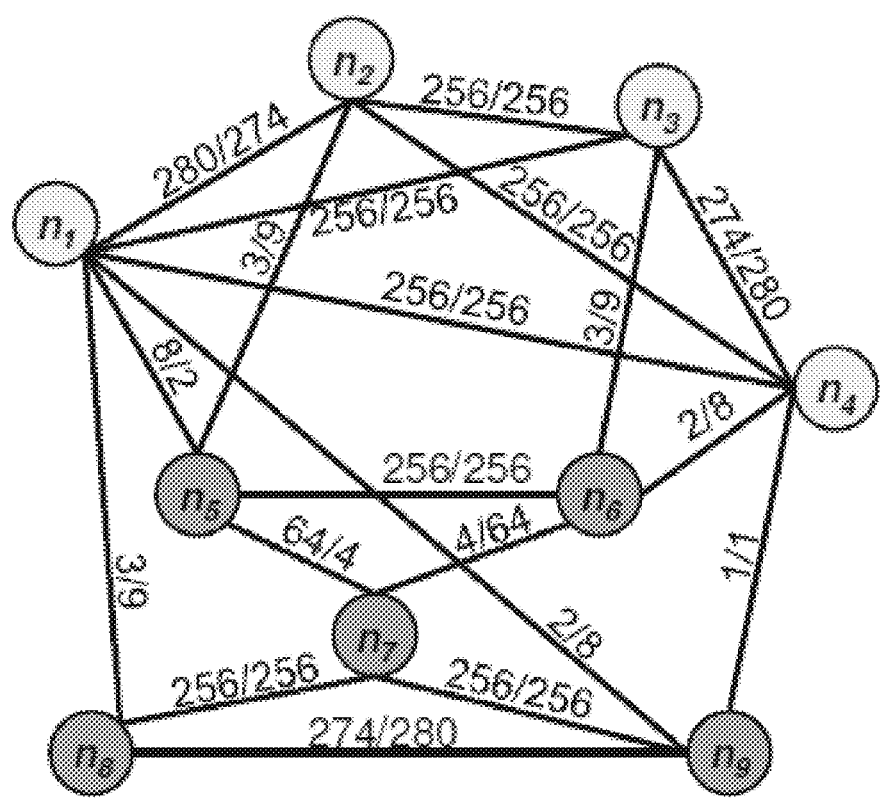
FIG. 3 illustrates a connection graph representation for the OTA in FIG. 2 according to an embodiment of the present invention.

Similarly, all the other interconnection codes corresponding to each edge in the connection graph can be obtained, and the connection graph containing all interconnection codes is shown in FIG. 3.

Constraint Annotation

As symmetry and proximity constraints are common in analog layout design, an embodiment of the presentation invention enables an automatic extraction of both symmetry and proximity constraints from each legacy layout, $l_L \in L_L$, and annotation of the constraints in the corresponding connection graph, $G_{s_L}$. Such constraints can help to reduce the search space during design matching and pattern extraction.

Based on the coordinate of each device, a pair of devices which are placed and routed symmetrically can be easily identified from $l_L$, and the adjacency relationship among different devices can also be easily identified. After identifying both symmetry and proximity constraints from $l_L$, this information is then annotated in $G_{s_L}$.

Figure 4:
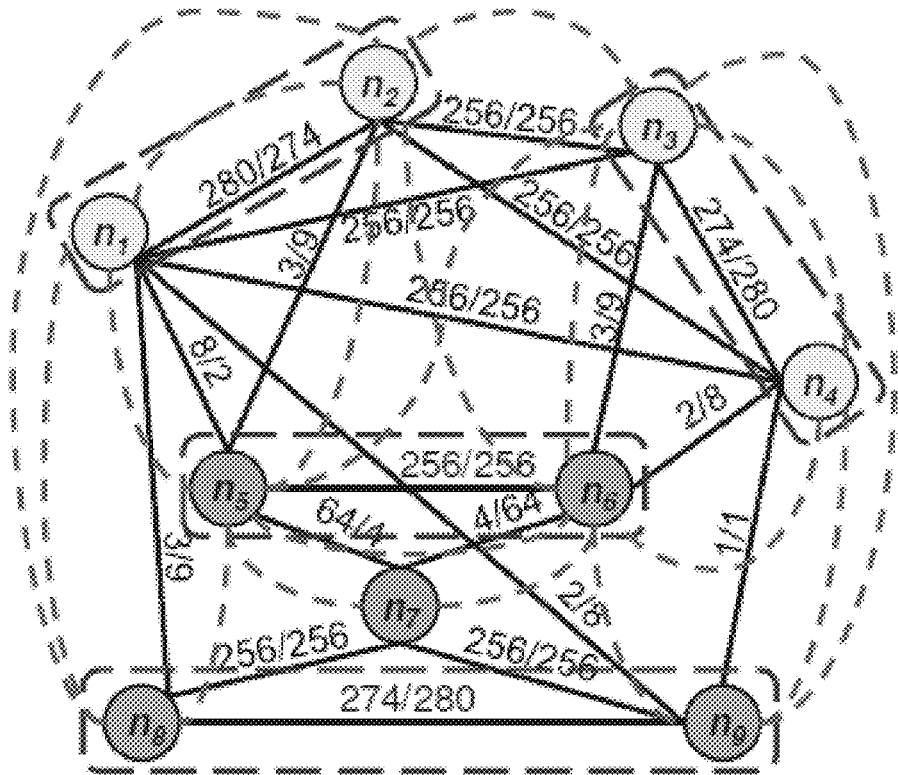
FIG. 4 illustrates a resulting connection graph after annotating both symmetry and proximity constraints in the connection graph of FIG. 3 according to an embodiment of the present invention.
Figure 4:
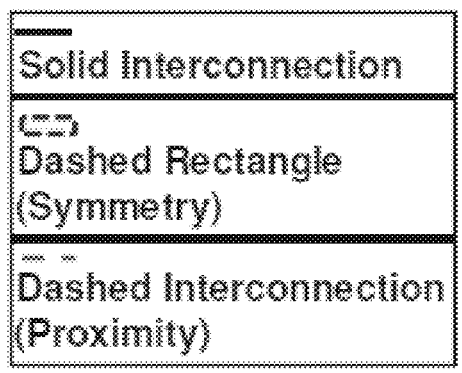

Table II gives an example of the extracted symmetry and proximity constraints from the legacy layout $l_L$ of the circuit, which contains four symmetry pairs. Each device in $l_L$ has its adjacent devices. Based on Table II, FIG. 4 shows the resulting connection graph after annotating both symmetry and proximity constraints in the connection graph of FIG. 3. The annotated connection graphs of all legacy design is then stored in the design knowledge database.

TABLE II

THE EXTRACTED SYMMETRY AND PROXIMITY CONSTRAINTS FROM $l_L$ OF THE CIRCUIT IN FIG. 2(A).

| Symmetry constraints | Proximity constraints |
|---|---|
| $\{M_1, M_2\}$ | $M_1$ ($M_2$, $M_5$, $M_8$) |
| $\{M_3, M_4\}$ | $M_2$ ($M_1$, $M_3$, $M_5$, $M_6$, $M_8$) |
| $\{M_5, M_6\}$ | $M_3$ ($M_2$, $M_4$, $M_5$, $M_6$, $M_9$) |
| $\{M_8, M_9\}$ | $M_4$ ($M_3$, $M_6$, $M9$) |
| | $M_5$ ($M_1$, $M_2$, $M_3$, $M_6$, $M_7$, $M_8$) |
| | $M_6$ ($M_2$, $M_3$, $M_4$, $M_5$, $M_7$, $M_9$) |
| | $M_7$ ($M_5$, $M_6$) |
| | $M_8$ ($M_1$, $M_2$, $M_5$) |
| | $M_9$ ($M_3$, $M_4$, $M_6$) |

Other constraints in an analog layout design may be noises introduced by, for example, current mirrors, operational speeds of amplifiers, power consumption of analog circuits or sub-circuits, etc. In some embodiments, attributes of noises introduced in current mirrors, operation speeds and power consumptions of the symmetry may be tagged or annotated to the nodes or edges in addition to symmetry and/or proximity constraints.

Knowledge-Based Design Matching and Pattern Extraction

Based on the generated design knowledge database, a set of design patterns, DP, can be recognized. After obtaining all DP, the number of DP can be minimized by eliminating all redundant DP and a DP will be chosen to generate the layout of the target design, $l_T$, as described in detail below.

Design Pattern Recognition

In an embodiment, the problem formulation is to utilize a set of legacy layouts, $L_L$, as much as possible to generate a target layout, $l_T$, such that the quality of $l_T$ is comparable that of legacy layouts, $L_L$. As $s_L$ may not be identical to $s_T$, only the layout of the sub-circuit contained in both $s_L$ and $s_T$ (i.e., the same circuit structure) can be reused to generate $l_T$, which can be formulated as a sub-circuit identification problem.

Figure 5A:
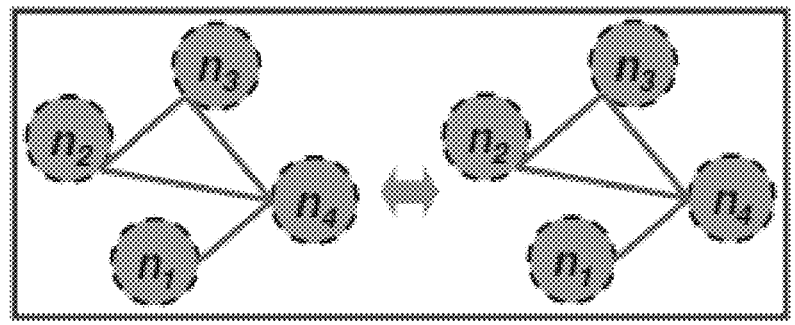
FIGS. 5A through 5C illustrate the difference among various graph comparison problems according to an embodiment of the present invention.
Figure 5B:
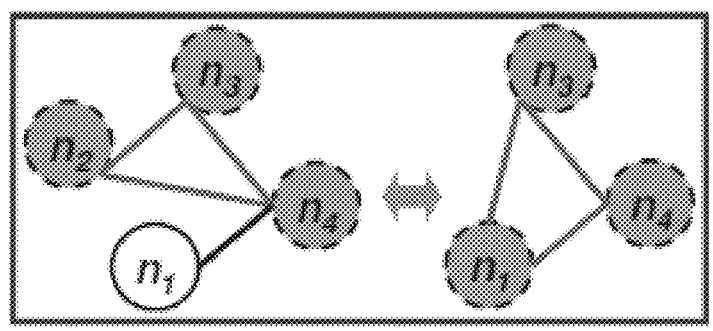
Figure 5C:
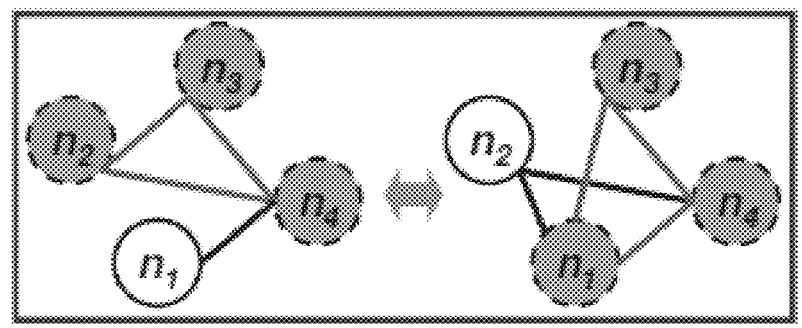

In circuit comparison, all compared circuits are represented as a graph, and then the graph-based algorithms are applied for graph comparison. Although several graph comparison algorithms have been proposed, those algorithms only verify either whether two graphs are identical (i.e., graph isomorphism), or whether a given sub-graph is contained in another graph (i.e., sub-graph isomorphism). Such kinds of algorithms cannot be directly adopted to extract all common sub-graphs contained in two different graphs (i.e. sub-graph identification). Therefore, an embodiment of the present invention provides a new design matching and pattern extraction algorithm to identify all sub-graphs in the connection graph of the target design, $G_{S_T}$, which are also present in the connection graphs of all legacy design. FIGS. 5A through 5C illustrate the difference among graph isomorphism, sub-graph isomorphism, and sub-graph identification.

Before starting pattern recognition procedure, the schematic of the target design, $s_T$, is converted to the corresponding $G_{S_T}$ by the aforementioned method as described above. The symmetry and/or proximity constraints of $s_T$ are also annotated in $G_{S_T}$, which can either be given by designers or automatically extracted. For the explanation of the novel and inventive pattern recognition procedure, the terms symmetric counterpart and design pattern are defined as follows.

Definition of Symmetric Counterpart and Design Pattern.

---

Definition 1: The symmetric counterpart of a symmetry pair of $n_i$ and $n_{i'}$ is $n_i$ and $n_{i'}$.
Definition 2: A design pattern, DP, is a sub-graph which is contained in both $G_{S_L}$ and $G_{S_T}$.
Given $G_{S_L}$ and $G_{S_T}$, we apply the folloewing pattern recognition procedure to identify a DP:
1) Select a pair of inital nodes, $n_i \in G_{S_T}$, and $n_j \in G_{S_L}$, such that device_type($d_i$) = device_type($d_j$).
2) Initialize DP = {$n_i$ ($n_j$)}.
3) Select a new pair of nodes, $n_x \in G_{S_T}$ and $n_y \in G_{S_L}$ such that
   a) device_type($d_x$) = device_type($d_y$)
   b) ∃ nj ∈ DP ∩ $G_{S_L}$ is adjacent to $n_y$.
   c) ∀ $n_i \in$ DP ∩ $G_{S_T}$ and ∀ $n_j \in$ DP ∩ $G_{S_L}$, $\Gamma_{i \to x}$ = $\Gamma_{j \to y}$.
4) Add $n_x$ ($n_y$) to DP if all feasible conditions (a), (b), and (c) in the previous step are satisfied.
5) Repeat Steps 3-4 until no node can be further added to DP.

---

In order to satisfy the symmetry constraints, a symmetry pair $n_i$ and $n_{i'} \in G_{S_T}$ will be mapped to a symmetry pair $n_j$ and $n_{j'} \in G_{S_L}$ and all feasible conditions in Step 3 and Step 4 must be held for both $n_i$ and $n_j$. It should be noted that there may be interconnection between a symmetry pair, so the feasible condition $\Gamma_{i \to i'} = \Gamma_{j \to j'}$ must be verified to guarantee the same circuit structure is identified. Although it tries to satisfy the symmetry constraints by mapping a symmetry pair $n_j$ and $n_{j'} \in G_{S_L}$ to a symmetry pair $n_i$ and $n_{i'} \in G_{S_T}$, it still may not find a corresponding symmetry pair $n_j$ and $n_{j'}$ at the end of pattern recognition procedure. Therefore, it will repeat Steps 3-4 again without considering the symmetry of $l_L$. After obtaining $l_T$, some adjustments will be applied on $l_T$ to correct all symmetry violations. In order to generate more DP to further improve the quality of $l_T$, ∀$n_i \in G_{S_T}$ and ∀$n_j \in G_{S_L}$ will be considered as initial nodes during the pattern recognition procedure.

Figure 6A:
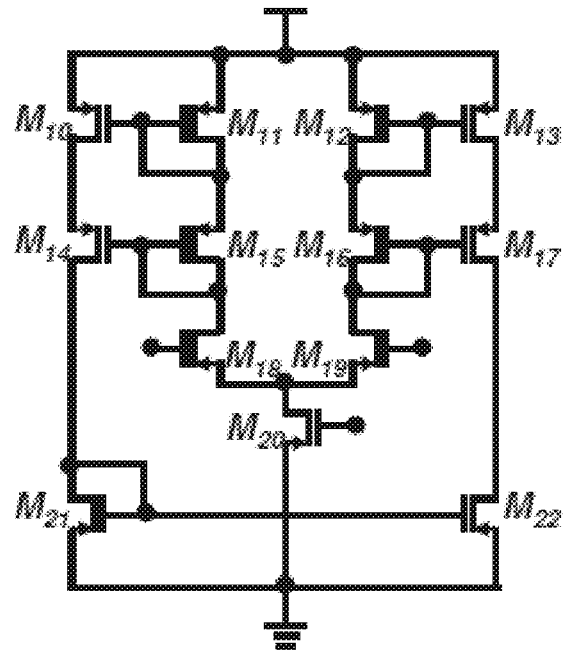
FIG. 6A illustrates an exemplary CMOS cascade OTA target.
Figure 6B:
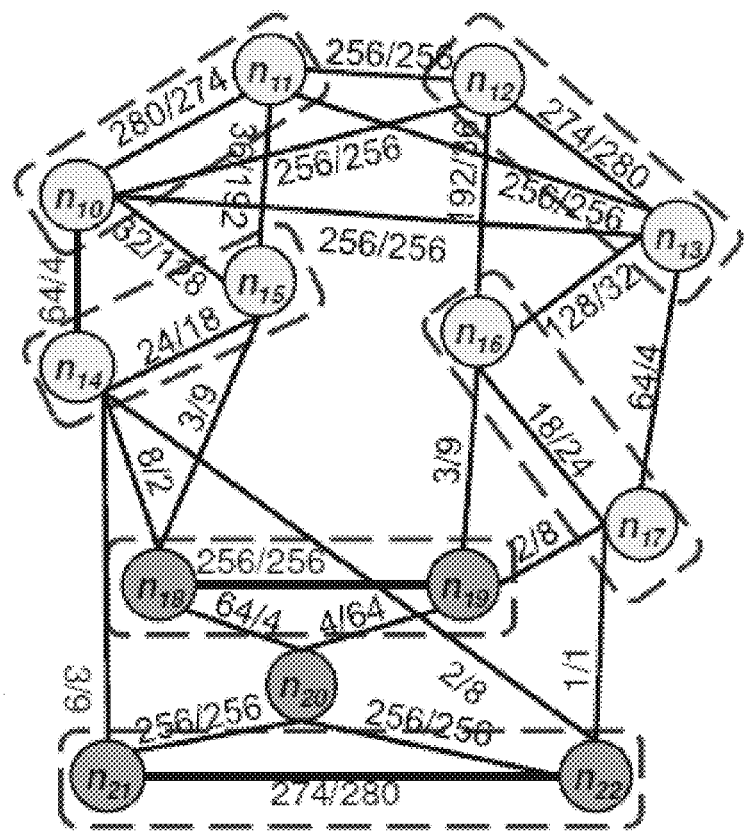
FIG. 6B illustrates the corresponding connection graph according to an embodiment of the present invention.

For example, given $s_L$, as shown in FIG. 2A, and $s_T$, as shown in FIG. 6A, the corresponding $G_{S_L}$ and $G_{S_T}$ are generated, as shown in FIG. 4 and FIG. 6B, respectively. The symmetry pairs of $s_T$ given in Table III are also annotated in $G_{S_T}$. Assuming that $n_{20} \in G_{S_T}$ and $n_7 \in G_{S_L}$ are selected as the initial nodes, the resulting DP containing 5 MOS transistors can be derived as shown in Table IV based on the above procedure.

Table III lists all given symmetry constraints of $S_T$ in FIG. 6A.

TABLE III

| Symmetry constraints | | | |
|---|---|---|---|
| {$M_{10}$, $M_{11}$} | {$M_{12}$, $M_{13}$} | {$M_{14}$, $M_{15}$} | {$M_{16}$, $M_{17}$} |
| {$M_{18}$, $M_{19}$} | {$M_{21}$, $M_{22}$} | | |

Table IV lists the resulting design pattern (DP) derived from FIG. 4 and FIG. 6A.

TABLE IV

| All CMOS transistors contained in a DP |
|---|
| $M_{18}$ ($M_5$), $M_{19}$ ($M_6$), $M_{20}$ ($M_7$), $M_{21}$ ($M_8$), $M_{22}$ ($M_9$) |

As demonstrated in step 3.c of the pattern recognition procedure, only when the feasible condition, $\Gamma_{i \to x} \to \Gamma_{j \to y}$ (i.e., $TC_{i \to x} \to TC_{j \to y}$), is satisfied $n_x$ ($n_y$) can be identified as a DP. Under such limitation, it may not effectively utilize more reusable layout patterns from $l_L$ to create $l_T$ when the circuit structure of $s_L$ and $s_T$ are not exactly the same. The inventors discovered that the layout of the sub-circuit $d_i$ and $d_x$ can also be created by utilizing the layout of the sub-circuit $d_j$ and $d_y$ if $TC_{j \to y} \subseteq TC_{i \to x}$. In order to effectively extract more reusable layout patterns from $l_L$, the feasible condition $\Gamma_{i \to x} = \Gamma_{j \to y}$ (i.e., $TC_{i \to x} \to T\,C_{j \to y}$) in Step 3.c is replaced with the following equation:

$$TC_{j \to y} \subseteq TC_{i \to x}. \quad (3)$$

It should be noted that all redundant connections, $TC_{i \to x}$-$TC_{j \to y}$, must be eliminated from $l_L$ to obtain an identical circuit structure for $l_T$ and $s_T$.

For the convenience of verifying whether two sub-circuits are identical based on the connection graph during pattern recognition procedure, all terminal connections of two devices are represented by an interconnection code and is tagged on the edge of the respective nodes in the connection graph. Each time a new pair of nodes are explored during pattern recognition procedure, it needs to verify whether the feasible condition as given in Equation (3) is satisfied, so a reverse procedure must be applied to transform the corresponding interconnection code to the set of terminal connections. As given in Equation (1), the interconnection code is obtained by adding up all interconnection code indices which are all numbers of the power of 2. Therefore, a reverse procedure is to transform a given interconnection code to different interconnection code indices, and a set of terminal connections can be finally derived by mapping each interconnection code index to the corresponding terminal connection.

Figures 7A, 7B:
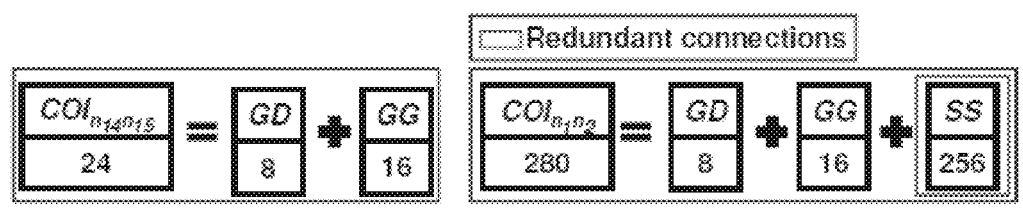
FIG. 7A illustrates the set of terminal connections of FIG. 6A.
FIG. 7B illustrates the set of terminal connections of FIG. 4 according to an embodiment of the present invention.

FIG. 7A illustrates the set of terminal connections $TC_{14 \to 15}$ in FIG. 6B. FIG. 7A illustrates the set of terminal connections $TC_{1 \to 2}$ in FIG. 4.

Given $\Gamma_{14 \to 15}$ and $\Gamma_{1 \to 2}$, as shown in FIG. 6(b) ($G_{S_T}$) and in FIG. 4 ($G_{S_L}$), a set of terminal connection $TC_{14 \to 15}$ and $TC_{1 \to 2}$ can be easily derived as illustrated in FIGS. 7A and 7B, respectively. As shown in FIG. 7A, $TC_{14 \to 15}$ contains two terminal connections GD and GG while $TC_{1 \to 2}$ contains three terminal connections GD and DD, and a redundant connection SS (SS ⊄ $TC_{14 \to 15}$) (as shown in FIG. 7B). Since $TC_{14 \to 15} \subseteq TC_{1 \to 2}$, n14 (n1) will be added to DP during pattern recognition procedure. By applying the same example as shown in Table IV and substituting Equation (3) as the new feasible condition for Step 3.c of the pattern recognition procedure, a new DP containing nine MOS transistors can be derived as listed in Table V.

Table V illustrates the resulting DP derived from FIG. 4 and FIG. 6B after considering Equation (3) as the feasible condition for step 3.c of the pattern recognition procedure.

TABLE V

All CMOS transistors contained in a DP

M14 (M1)*, M15 (M2), M16 (M3), M17 (M4)
M18 (M5), M19 (M6), M20 (M7), M21 (M8), M22 (M9)

*$d_i$ ($d_j$) indicates the layout of $d_j$ is an element of $G_{sL}$ and is used to create the layout of $d_i$ that is an element of $G_{sT}$.

Design Pattern Pruning

After Obtaining a set of DP, a corresponding pattern graph (PG) can be constructed, where a vertex represents a DP and two vertices will be connected by an edge if two corresponding DP do not contain the same device $d_i \in G_{s_T}$ such that both DP can be simultaneously selected. In order to reduce the problem complexity of pattern selection in next step, some redundant vertices in PG will be eliminated. Before introducing how to eliminate the redundant vertices in PG, the candidate set and reusability (alternatively referred to as reusability index hereinafter) are defined as follows.

Definition of Candidate Set and Reusability

Definition 3: In PG, the candidate set of a vertex $v_i$ (CanSet$_{v_i}$) is the set of vertices which have an edge connecting to $v_i$.

Definition 4: In PG, the reusability of a vertex $v_i$ ($R_{v_i}$) refers to the number of devices (DevNum$_{n_i}$) and the number of nets (NetNum$_{n_i}$) contained in the corresponding DP.

For two vertices $v_i$ and $v_j$, $R_{v_i} > R_{v_j}$ if one of the following conditions is satisfied:
1. DevNum$_{v_i}$ > DevNum$_{v_j}$
2. DevNum$_{v_i}$ = DevNum$_{v_j}$ and NetNum$_{v_i}$ > NetNum$_{v_j}$ Based on the property of PG, if two vertices $v_i$ and $v_j$ have no interconnection, then only either $v_i$ or $v_j$ can be chosen during pattern selection procedure. Assume two vertices $v_i$ and $v_j$ which have no interconnection is given such that:
1. CanSet$_{v_i}$ ⊆ CanSet$_{v_j}$ (i.e., the candidate set of vertex $v_i$ is a subset of the candidate set of vertex $v_j$)
2. Rvi < Rvj (i.e., the reusability of vertex v is less than the reusability of vertex $v_j$)

Based on condition (1), it implies that $\forall_{vk}$ can be selected with $v_i$, then it can also be selected with $v_j$. However, $\forall_{vk} \in$ CanSet$_{v_i}$ ∩ CanSet$_{v_j}$, it will be selected with $v_j$ based on condition (2) because a greater number of devices and nets can be reused to create the target layout $l_T$ (higher re-usage of $l_L$). Therefore, vi is regarded as a redundant vertex and can be eliminated in advance to reduce the problem complexity of pattern selection in next step. The formal definition of redundant node is given as follows:

Definition 5: For a vertex $v_i$ in PG, $v_i$ is called a redundant vertex ∃$v_j$ has no interconnection with $v_i$ such that CanSet$_{v_i}$ ⊆ CanSet$_{v_j}$ and $R_{v_i} < R_{v_j}$.

Figures 8A, 8B, 8C:
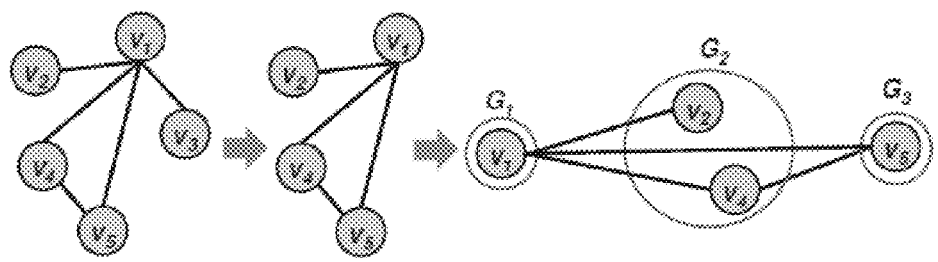
FIG. 8A illustrates the derived pattern graph (PG) based on Table VI.
FIG. 8B illustrates the resulting PG after removing a vertex v3 from FIG. 8A.
FIG. 8C illustrates the PG in FIG. 8B that is partitioned into three groups according to an embodiment of the present invention.

Based on Definition 5, all redundant vertices can be effectively eliminated by checking all pairs of vertices in PG to reduce the number of vertices. By performing the pattern recognition procedure on FIG. 4 and FIG. 6(b), it can obtain five DPs as demonstrated in Table VI, then a corresponding PG can be generated as shown in FIG. 8A. According to Table VI, $v_3$ is a redundant vertex because CanSet$_{v_3}$ ⊆ CanSet$_{v_2}$ and $R_{v_3} < R_{v_2}$. By removing v3 from PG, the resulting PG is illustrated in FIG. 8B. In order to further reduce the problem complexity of pattern selection in next step, it will constrain the way of pattern being selected by partitioning the PG into different groups such that all vertices in a group form a maximal independent set and only one of these vertices can be chosen in pattern selection step. For example, the PG in FIG. 8B can be partitioned into 3 groups as shown in FIG. 8C, and either $v_2$ or $v_4$ can be chosen from $G_2$. By constraining the way of pattern being selected, it is unnecessary to verify whether two DPs which are in the same group can be simultaneously selected during pattern selection step.

Table VI illustrates all generated design patterns DP based on FIG. 4 and FIG. 6B.

TABLE VI

| DP | Contained devices | D | N |
|---|---|---|---|
| 1 | $M_{10}, M_{11}, M_{12}, M_{13}$ | 4 | 6 |
| 2 | $M_{14}, M_{15}, M_{16}, M_{17}, M_{18}, M_{19}, M_{20}, M_{21}, M_{22}$ | 9 | 15 |
| 3 | $M_{14}, M_{15}, M_{16}, M_{17}, M_{18}, M_{19}, M_{20}$ | 7 | 9 |
| 4 | $M_{18}, M_{19}$ | 2 | 1 |
| 5 | $M_{20}$ | 1 | 0 | where the left-most column denotes the design pattern (vertex), the second rightmost column denotes the number of devices contained in a corresponding design pattern DP (vertex), and the rightmost column denotes the number of nets contained in the corresponding design pattern DP (vertex). The number of contained devices and the number of contained nets define the reusability index of the corresponding vertex.

Design Pattern Selection

After the previous step, it can obtain a PG that is divided into different groups as shown in FIG. 8C. Then, it can hierarchically merge two groups to determine which candidates will be selected to generate the $l_T$ while maintaining the maximum re-usage of $l_L$. During the procedure of hierarchical group merging, two vertices are tried to be merged to form a larger clique (to form a larger vertex) to maximize the reusage of $l_L$. By iteratively performing the above steps, a single group containing several vertices with maximum re-usage of $l_L$ can be finally obtained, where each vertex in the group is one possible solution to be used to generate $l_T$. It should be noted that the redundant vertices will also be checked and eliminated during hierarchical group merging to avoid generating lots of unnecessary redundant vertices.

Figure 9:
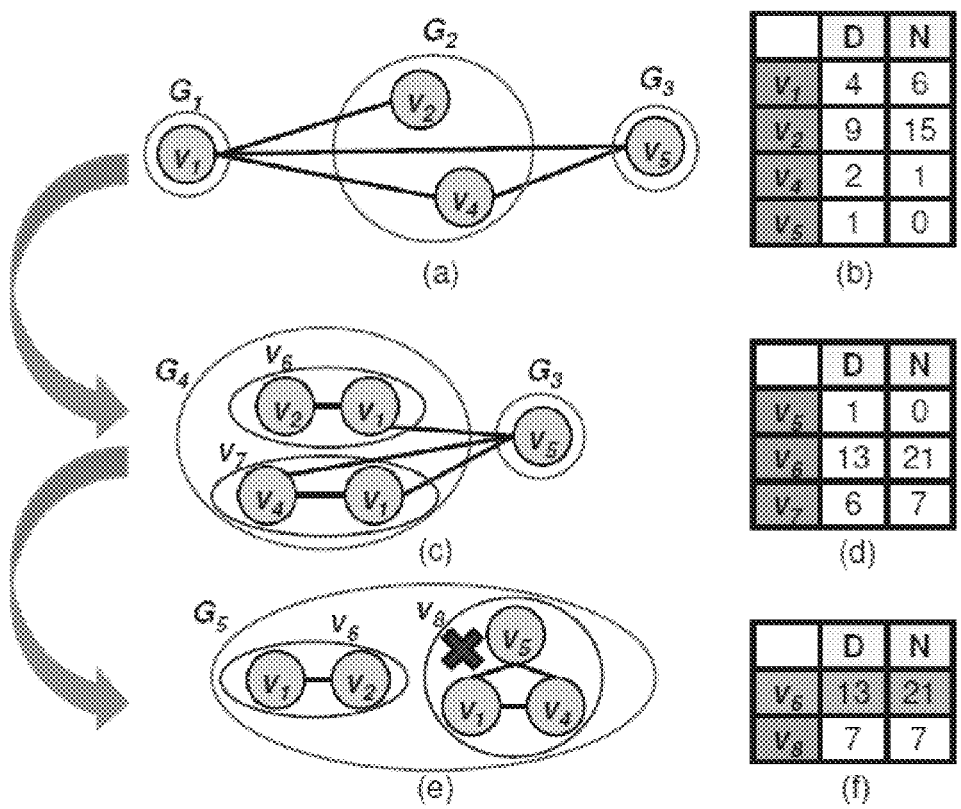
FIGS. 9(a) through 9(f) illustrate an hierarchy group merging example according to an embodiment of the present invention.

By the same example in FIGS. 8A-8C, it is initially given a PG with 3 groups as shown in FIG. 9(a) and the number of contained devices (D) and nets (N) of each vertex is shown in FIG. 9(b). After merging two groups $G_1$ and $G_2$ to form $G_4$, two generated vertices $v_6$ and $v_7$ are derived as shown in FIG. 9(c), and D and N of each vertex is shown in FIG. 9(d). Finally, a single group with two vertices $v_6$ and $v_8$ can be generated as demonstrated in FIG. 9(e). Since CanSet$_{v_6}$ ⊆ CanSet$_{v_8}$ and $R_{v_8} < R_{v_6}$, $v_8$ is a redundant vertex based on Definition 5 and can be eliminated. As a result, the layout of the corresponding DP of $v_1$ and $v_2$ will be used to create $l_T$.

FIG. 9(a) through 9(f) illustrate an hierarchy group merging example. FIG. 9(a) illustrates an example PG. FIG. 9(b) illustrates the number of contained devices and nets of each vertex in FIG. 9(a). FIG. 9(c) illustrates the resulting PG by merging G1 and G2. FIG. 9(d) illustrates the number of contained devices and nets of each vertex in FIG. 9(c). FIG. 9(e) illustrates the resulting PG by merging G4 and G3. FIG. 9(f) illustrates the number of contained devices and nets of each vertex in FIG. 9(e).

Knowledge-Based Layout Generation

After determining which DP will be used to generate $l_T$, it will first extract the corresponding layout of each selected. DP from $l_L$ and migrate the extracted layout to new technology as described below. Then, the existing placement and routing algorithms can be applied to generate $l_T$ to assemble the migrated layouts of DP.

Design Pattern Layout Extraction and Migration

Figure 10:
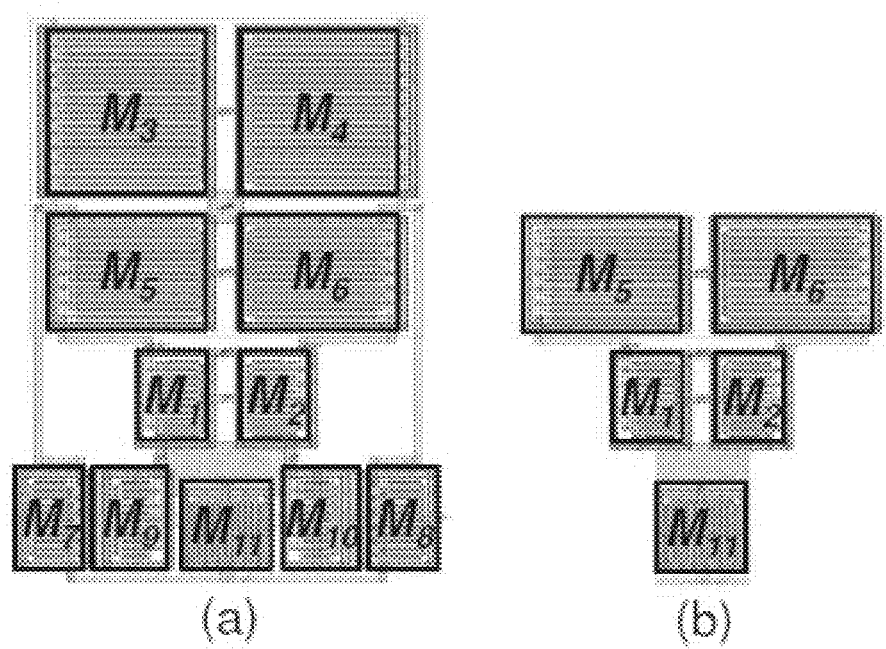
FIG. 10A illustrates an example legacy layout.
FIG. 10B illustrates the extracted layout of a design pattern (DP) containing five devices in FIG. 10A according to an embodiment of the present invention.

After the previous stage, it will obtain several DP which will be used to create $l_T$ and it will extract the corresponding layout for each selectee DP from $l_L$. In an embodiment, the physical information of a layout can be obtained by utilizing OpenAccess API. Therefore, the layout of each selected DP can be easily identified by scanning $l_L$. For example, given a $l_L$ as shown in FIG. 10(a), the corresponding layout of a DP containing $M_1$, $M_2$, $M_5$, $M_6$, and $M_{11}$ of $l_L$ can be derived as shown in FIG. 10(b).

Since the process parameters in the legacy design may be different with the target design (e.g., different transistor width and height), some adjustments should be performed on the extracted layout to satisfy the design specification. Various layout migration algorithms may be applied to the extracted layout to correct the process parameters.

Design Pattern Layout Integration

After obtaining the corresponding extracted layout of each DP, it can perform pattern-based placement and routing to generate $l_T$. Since the traditional device-based placement and routing usually needs to handle tens or hundreds of devices, the problem complexity is relative higher. However, the schematic of different analog circuits are usually similar to each other, the number of required DP used to create $l_T$ is relatively low comparing with the number of devices. It should be noted that the number of required DP can be further reduced if more and more $l_L$ are used to expand the design knowledge database. Therefore, the pattern-based placement and routing can be easily performed either using state-of-the-art analog placement/routing algorithms or by experienced layout professionals.

For pattern-based placement problems, several known analog placement algorithms can be directly applied to handle the pattern-based analog placement problems. It should be noted that the layouts of all DP are originally derived from $l_L$, so the contour of each extracted layout of a DP may be rectilinear and should be carefully compacted to minimize the area of $l_T$. Moreover, it should try to abut the same type of MOS transistors such that they can share the same diffusion to further reduce the area of $l_T$.

As for the pattern-based routing problem, any state-of-the-art analog router may be applied to connect all placed layouts. During pattern-based analog routing, the routing wire length should be kept to the minimum to reduce routing parasitics to avoid performance degradation. Moreover, some nets are also required to be symmetrically routed to achieve better parasitics matching. In an analog circuit, some routing nets are easily affected by the neighbor nets they are more sensitive to crosstalk), so the distance constraint may be required to reserve enough distance between two sensitive routing nets to reduce the impact of crosstalk.

Figure 11:
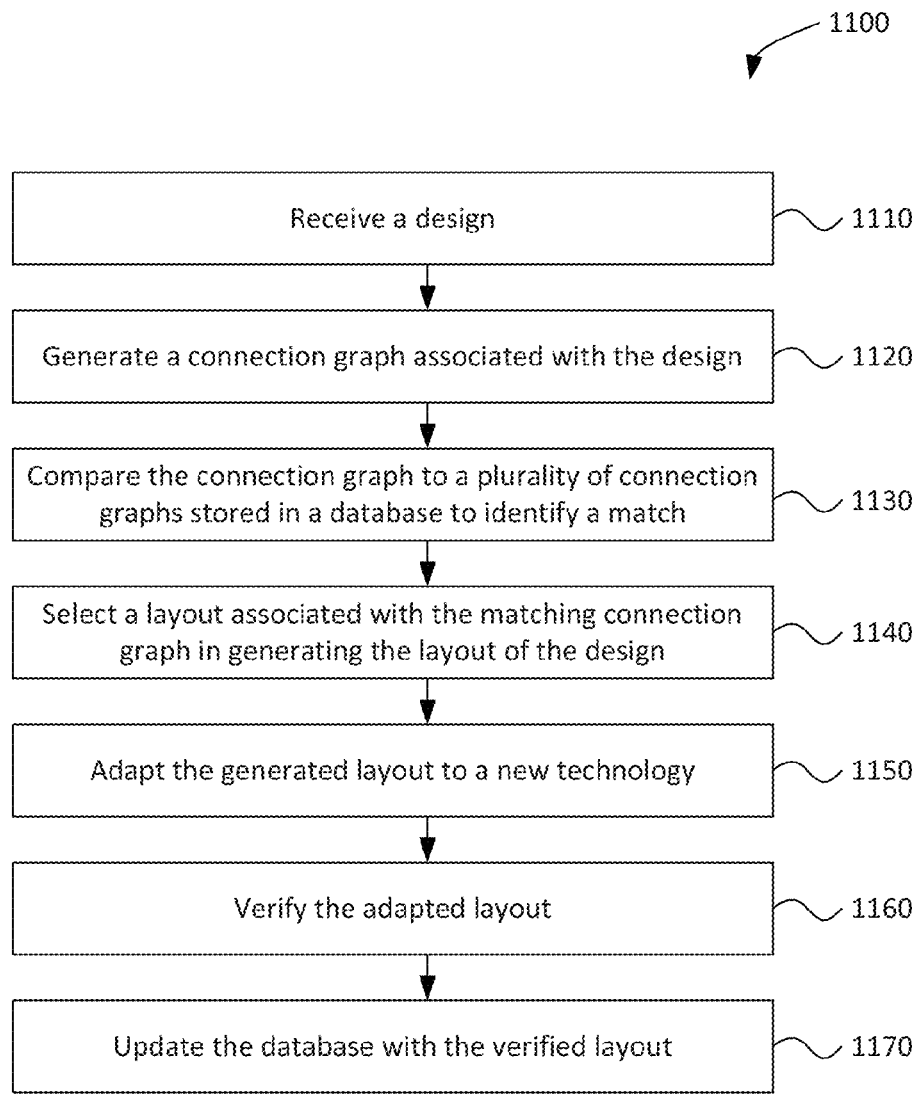
FIG. 11 is a flow chart of a method for generating a layout of a target design according to an embodiment of the present invention.

The above-described embodiments describe the knowledge-based layout design methodology that enables each designer to maintain his/her own design repository and effectively and efficiently generate various target layouts according to his/her own layout knowledge. FIG. 11 illustrates a flow chart of a method 1100 for generating a layout of a target design according to an embodiment of the present invention. Method 1100 begins at 1110 where a schematic representation of a design is received. The schematic representation may include multiple devices having associated terminals that are connected to each other by a plurality of nets. At 1120, a connection graph associated with the design is generated. The connection graph can be derived by converting the devices and nets containing in the schematic representation to respective nodes and edges. A device type (transistors types, diodes, resistors, capacitors, and the like) may be tagged on each node. Connections between devices are converted to edges between corresponding nodes. The connections (edges) between two devices (nodes) are assigned with corresponding terminal connection indices (TCI) that are values of power of 2. An interconnection code is then calculated as the sum of the terminal connection indices between two nodes and assigned to the corresponding edge. Processes or operations that automatically extract symmetry and proximity constraints, noises, power consumption, speed constraints from the design and annotate the constraints in the connection graph at 1120.

Upon constructing the connection graph of the design, terminal connection indices are determined and corresponding interconnection codes are computed and attached to the edges of the connection graph of the received design. At 1130, the connection graph of the received design is compared with a plurality of connection graphs stored in a database. The one or more patterns may be identified by selecting a first node in a selected connection graph stored in the database and a first node in the connection graph of the received design. The first nodes are the same device type (e.g., they are both PMOS or NMOS devices). The interconnection codes of the first nodes are compared. If the interconnection codes of the first nodes are the same, then the pattern associated with first node of the existing connection graph is added to a set of design pattern. The identification process will continue by selecting a second node in the existing connection graph (the existing connection graph is referred to as the connection graph stored in the database) and a second node in the target connection graph (the target connection graph is referred to as the received design) of the same device type and comparing the associated interconnection codes. If the comparison is positive, i.e., the associated interconnection codes of the second nodes are the same, the pattern associated with the second node of the existing connection graph is added to the set of design pattern. Operations or processes at 1130 may repeat for all nodes in the existing and target connection graphs. A pattern in the set of design patterns is then identified to be used for the layout of the target design at 1140. At 1150, the identified pattern is further migrated to a new technology or new process with different design rules to generate an optimized layout for the new technology. At 1160, the optimized layout may be submitted to a thorough verification by a skilled or experienced designer based on the design rules of the new technology or new process. Once the optimized layout is approved, it then can be stored in the design-knowledge database for reuse at 1170.

Figure 12:
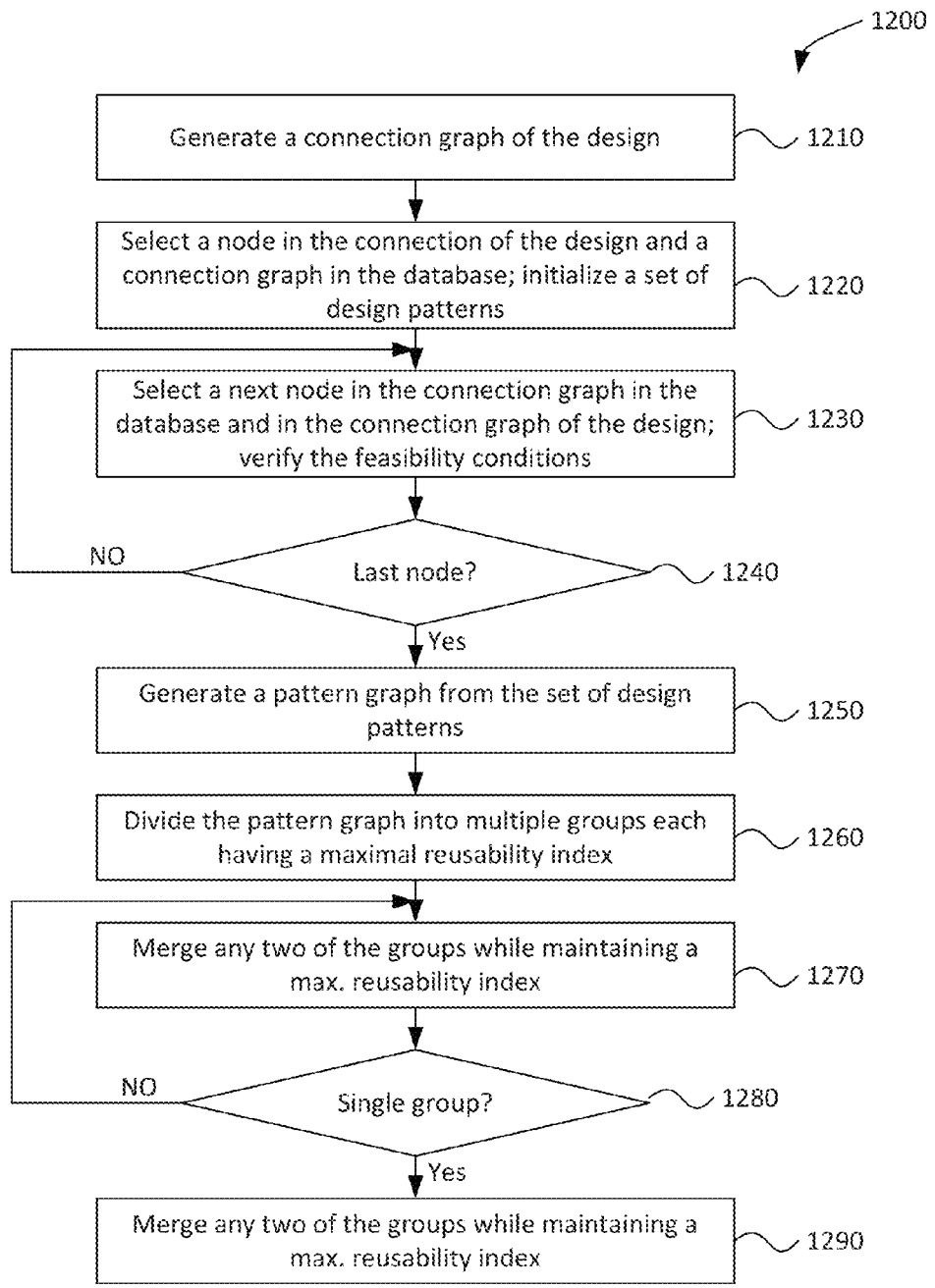
FIG. 12 is a flow chart of a method of design pattern identification and selection of a pattern that is common to the target and legacy (existing) designs according to an embodiment of the present invention.

It should be noted that while method 1100 is described with reference to FIG. 1, this is done for simplicity of illustration. Embodiments of the invention can incorporate a variety of processes or operations in the identification of a layout for the target design. FIG. 12 is a flow chart of a method 1200 of design pattern identification and selection of a pattern that is common to the target (the received design) and legacy (i.e., existing) designs according to an embodiment of the present invention.

Method 1200 can begin with identifying the pattern common to the target design (the received design) and the legacy (existing design stored in the database). Starting at 1210, a connection graph of the target design (the design that has been read in) is generated. The target connection graph and the legacy connection graph can be generated the same way as described in sections above. For instance, the interconnection codes between pairs of the devices are computed, devices and nets are converted to nodes and edges, respectively. The computed interconnection codes are attached to the edges of the target connection graph. The symmetry and/or proximity constraints of the target design can also be annotated in the target connection graph. At 1220, a node of the legacy connection graph and a node of the target connection graph are selected such that the nodes are of the same device type (e.g., a PMOS or NMOS device), and a set of design patterns (a design pattern is referred to as a sub-graph that contains in both the legacy connection graph and the target connection graph) is initialized. At 1230, a next node of the legacy connection graph and a next node of the target connection graph are selected and verified that the feasible conditions are met. In an embodiment, the feasible conditions may include: (a) the next nodes in the target connection graph and in the legacy connection graph are selected to be the same device type; (b) at least one of nodes that are common to (belong to or contain in both of) the set of the design pattern and to the set of legacy connection graph is adjacent to the next node, $n_y$, of the legacy connection graph; and (c) for all nodes that are common to both of the set of design patterns and the target connection graph and for all nodes that are common to both of the set of design patterns and the legacy connection graph, the interconnection code of the node in the legacy connection is equal to the interconnection code of the node in the target connection graph. If the feasible conditions are met, the design pattern is added to the set of design patterns. It should be noted that, instead of verifying the equality of the interconnection codes of a node in the target and legacy connection graphs, the terminal interconnection indices of the nodes can also be verified according to an embodiment of the present invention. Since the interconnection code is the sum of all of the terminal connection indices of a node, a reverse procedure to transform a corresponding interconnection code to a set of terminal connection indices can be utilized. A set of terminal connections can be derived by mapping each terminal connection index to the corresponding terminal connection.

At 1240, if the last node in the target connection graph has not been selected, processes or operations at 1230 can be repeated for each node. At 1250, a pattern graph is generated from the set of the design patterns where a vertex represents a design patterns and two vertices are connected by an edge if two corresponding design patterns do not contain the same device in the target connection graph. In an embodiment, redundant vertices can be eliminated. For instance, if two vertices have no interconnection, the one that has a lower reusability index can be eliminated.

At 1260, the pattern graph is divided into multiple groups each having a maximal reusability index (since redundant vertices having lower reusability indices have been eliminated). At 1270, any two of the groups are hierarchically merged to reduce the groups to a single group while maintaining a maximum reusability index of the legacy layout. The merging operation or process will be repeated until a single group is obtained at 1280. If the single group contains multiple vertices, vertices that have low reusability indices will be eliminated, and the remaining vertex with the highest reusability index will be used as the target layout at 1290.

Figure 13:
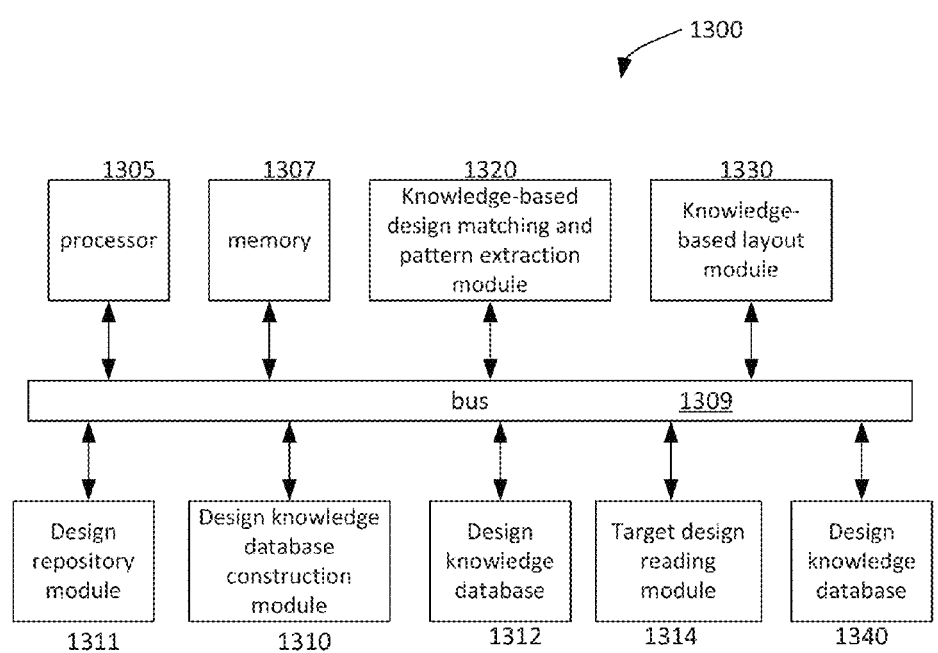
FIG. 13 is an exemplary computer system for generating a layout of a target design according to an embodiment of the present invention.

FIG. 13 is an exemplary computer system 1300 for generating a layout of a target design according to an embodiment of the present invention. Components of computer system 1300 that are well known to be part of the computer system are omitted for clarity. Computer system 1300 includes a processor 1305 having one or more processing units, a memory 1307, and a bus 1309. Computer system 1300 also includes a design repository module 1311 that may contain multiple schematics and associated layouts, a design knowledge database construction module 1310 that is configured to analyze the schematics and associated layouts, and a design knowledge database 1310 for storing the analyzed schematics and layouts. Computer system 1300 further includes a target design reading module 1314, a knowledge-based design matching and pattern extraction module 1320, a knowledge-based layout generation module 1330, and a layout adaption module 1340. Target design reading module 1314 reads in a target design that may include schematics and/or netlists containing devices and terminals that are interconnected each other through nets. Target design reading module 1314 may convert the read-in schematics and/or netlists to a connection graph, computes terminal connection indices and interconnection codes, and assigns them to the connection graph. Target design reading module 1314 may extract symmetry and proximity constraints from the target layout file and annotate the constraints in the connection graph. Knowledge-based design matching and pattern extraction module 1320 interacts with the target design reading module and the design knowledge database to find matches of design patterns in the database using the terminal connection indices and based on certain feasible conditions. Knowledge-based layout generation module 1330 generates a target layout. Knowledge-based layout generation module 1330 may generate multiple layout variants based on a new process or technology that may have different design rules. The modules may be communicated with each other and with processor 1305 and memory 1307 through bus 1309. The multiple layout variants may be verified by an expert designer for optimization. The optimized layout variants may be entered to the design repository module 1310 for further processing and storage for future re-use.

The present invention may be embodied in the form of computer-implemented methods and apparatus for practicing those processes or operations. The present invention may also be embodied in the form of computer program code embodied in tangible media, such as random access memory (RAM), CD-ROMs, DVDs, or any computer-readable medium.

Experimental Results

Figure 14A:
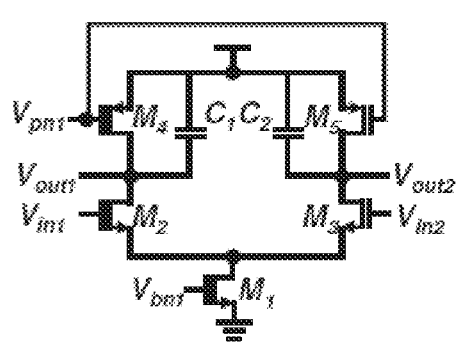
FIG. 14A illustrates an example legacy schematic of an NMOS differential amplifier.
Figure 14B:
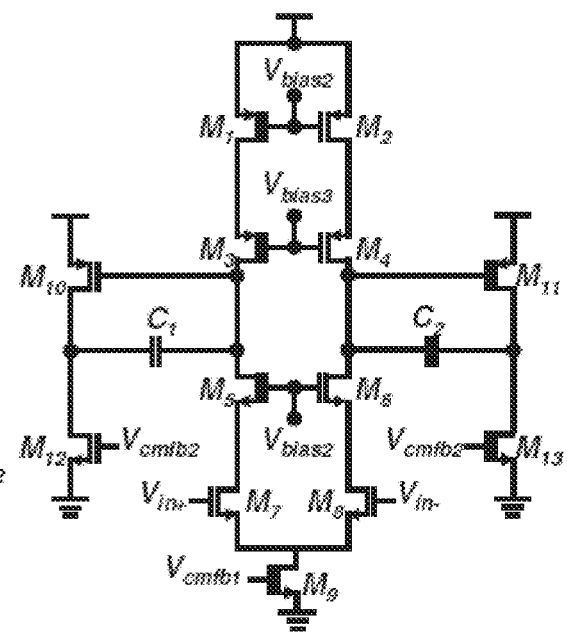
FIG. 14B illustrates an example target schematic of a two-stage Miller-compensated operational amplifier according to an embodiment of the present invention.

Embodiments of the knowledge-based analog layout methodology according to the present invention can be implemented in C programming language on a 2.0 GHz Linux machine with 32 GB memory. To demonstrate the effectiveness of our approach, the methodology based on the legacy design of an NMOS differential amplifier (Diff-Amp) was first tested to generate the target layout of a two-stage Miller-compensated operational amplifier (Op-Amp) as shown in FIG. 14, and the benchmark of legacy design and target design is given in Table VII. By facilitating the NMOS Diff-Amp to create $l_T$, 73.33% devices (11 out of 15 devices) and 23.53% nets (8 out of 34 nets) are reused as shown in Table VIII, and the resulting four derived DP are listed in Table IX. Since a multi-pin net is difficult to be fully reused from the same legacy design, each multi-pin net is divided into multiple two-pin nets to calculate the net re-usage.

Table VII lists the benchmark of the legacy design and target design in FIG. 14.

TABLE VII

| Legacy design | | Target design |
|---|---|---|
| Symmetry constraints | Proximity constraints | Symmetry constraints |
| {$M_2, M_3$} | $M_1$ ($M_2, M_3, C_1, C_2$) | {$M_1, M_2$} |
| {$M_4, M_5$} | $M_2$ ($M_1, M_4, C_1$) | {$M_3, M_4$} |
| | $M_3$ ($M_1, M_5, C_2$) | {$M_5, M_6$} |
| | $M_4$ ($M_2, C_1$) | {$M_7, M_8$} |
| | $M_5$ ($M_3, C_2$) | {$M_7, M_8$} |
| | $C_1$ ($M_1, M_2, M_4, C_2$) | {$M_{12}, M_{13}$} |
| | $C_2$ ($M_1, M_3, M_5, C_1$) | |

Table VIII lists the layout re-usage comparisons between manual layout and the layout generated according to an embodiment of the present invention. Note that the device re-usage is derived by dividing the number of reused devices with the number of total devices. Net re-usage is derived by dividing the number of reused nets with the number of total nets.

TABLE VIII

| Target layout | # of reused devices | # of reused nets | # of total devices | # of total nets | Device re-usage (%) | Net usage (%) |
|---|---|---|---|---|---|---|
| manual | 0 | 0 | 15 | 34 | 0% | 0% |
| Diff-Amp →Op-Amp | 11 | 8 | | | 73.33% | 23.53% |
| OTA →Op-Amp | 13 | 14 | | | 86.67% | 41.18% |
| Diff-Amp + OTA →Op-Amp | 15 | 16 | | | 100.00% | 47.06% |

Table IX lists the DPs that are derived from an NMOS differential amplifier.

TABLE IX

| DP | All MOS transistors involved in each DP |
|---|---|
| 1 | $M_1 (M_4), M_2 (M_5)$ |
| 2 | $M_3 (M_4), M_4 (M_5), C_1 (C_1), C_2 (C_2)$ |
| 3 | $M_7 (M_2), M_8 (M_3), M_9 (M_1)$ |
| 4 | $M_{10} (M_4), M_{11} (M_5)$ |

Assume a CMOS cascade OTA, as seen in FIG. 2(a), is chosen to create $1_T$, the device re-usage can be increased from 73.33% to 86.67% (13 out of 15 devices), and the net re-usage can be increased from 23.53% to 41.18% (14 out of 34 nets) as given in Table VIII, and the resulting four generated DP are listed in Table X.

Table X lists the DP that are derived from a CMOS cascade OTA.

TABLE X

| DP | All MOS transistors involved in each DP |
|---|---|
| 1 | $M_1 (M_1), M_2 (M_2), M_{10} (M_3), M_{11} (M_4)$ |
| 2 | $M_3 (M_1), M_4 (M_2)$ |
| 3 | $M_5 (M_8), M_6 (M_9)$ |
| 4 | $M_7 (M_5), M_8 (M_6), M_9 (M_7), M_{12} (M_8), M_{13} (M_9)$ |

Finally, if both NMOS Diff-Amp and CMOS cascade OTA are all utilized to create the layout of the target design, then all devices can be fully reused (device re-usage is 100%) and the net re-usage can be further improved from 41.18% to 47.06% (16 out of 34 nets) as demonstrated in Table VIII. The resulting four obtained DP are listed in Table XI, where pattern 1 is from CMOS cascade OTA. Therefore, if more $1_L$ are utilized to create $1_T$, then more devices and nets can be effectively reused from the layout of the legacy design and more expertise are also reversed from $1_L$. It should be noted that all the layouts of the target design in Table VIII can be generated immediately based on our proposed approach.

Figure 15:
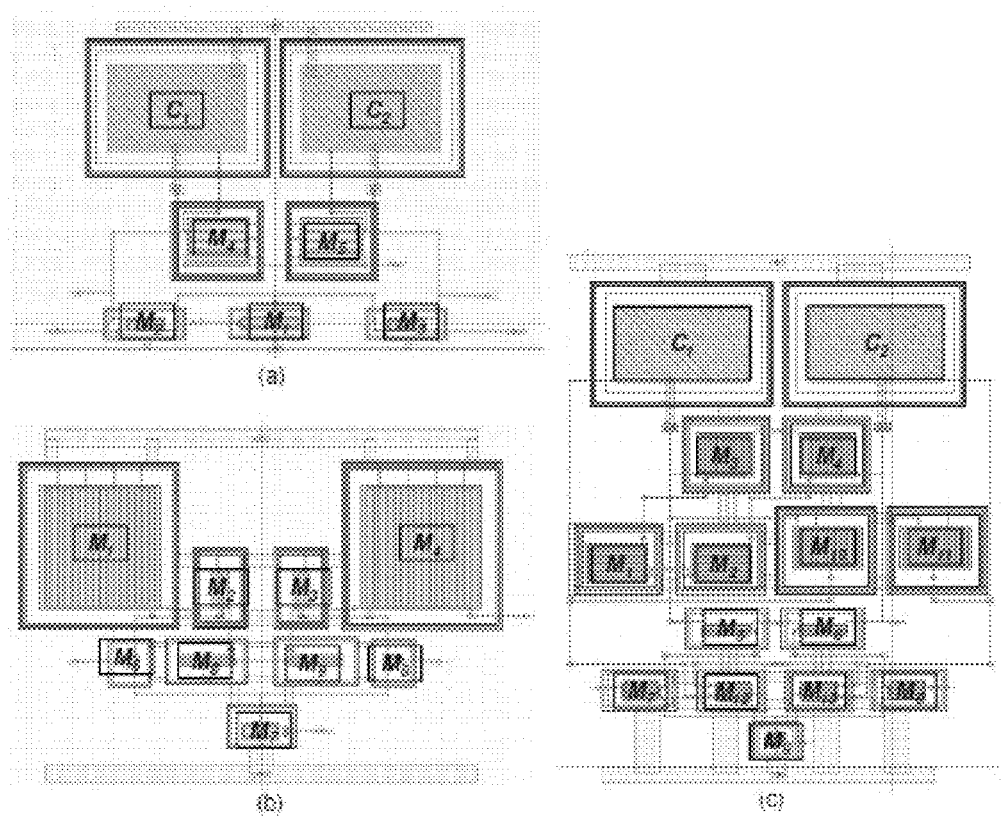
FIG. 15(a) illustrates an example legacy layout of an NMOS differential amplifier in the design repository according to an embodiment of the present invention.
FIG. 15(b) illustrates a legacy layout of a CMOS cascade operational transconductance amplifier in the design repository according to an embodiment of the present invention.
FIG. 15(c) illustrates the layout of a design two-stage Miller-compensated operational amplifier generated according to an embodiment of the present invention.

FIG. 15 shows the legacy layouts of the NMOS differential amplifier and the CMOS cascade operational transconductance amplifier in the design repository, as well as the layout of the two-stage Miller-compensated operational amplifier generated based on our approach by utilizing both legacy layouts.

A detailed description of exemplary embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:

1. A computer-implemented method for generating a layout of a design, the method comprising:
    invoking the computer to receive a schematic representation of the design, the schematic representation comprising a plurality of devices and associated terminals coupled to one another by a plurality of nets;
    generating a connection graph associated with the schematic representation of the design via the computer, said generating the connection graph comprising:
        calculating interconnection codes between pairs of devices;
        converting the devices and nets connecting the terminals to respective nodes and edges; and
        associating the interconnection codes to the edges of the connection graph;
    comparing the connection graph to a plurality of connection graphs stored in a database to identify a match via the computer; and
    selecting a layout associated with the matching connection graph in generating the layout of the design via the computer.

2. The method of claim 1, further comprising:
    migrating the generated layout to a new technology;
    verifying the migrated layout; and
    updating the database with the verified layout.

3. The method of claim 1, wherein an interconnection code between a pair of devices is a sum of values of terminal connection indices between the terminal of the pair of devices.

4. The method of claim 3, wherein the values of the terminal connection indices are powers of 2.

5. The method of claim 1 wherein generating the connection graph further comprises:
    extracting symmetry and proximity constraints from the existing design;
    and annotating the symmetry and proximity constraints in the connection graph.

6. The method of claim 5, wherein generating the connection graph further comprises: tagging device types on the nodes of the connection graph.

7. The method of claim 6, wherein generating the connection graph further comprises:

annotating attributes associated with noises, power consumption, or speed to the nodes of the connection graph.

8. The method of claim 7, wherein comparing the connection graph associated with the design to the plurality of connection graphs stored in the database comprises:
selecting a connection graph of the plurality of connection graphs stored in the database;
selecting a first node in the connection graph stored in the database and a first node in the connection graph associated with the design, the first node in the connection graph stored in the database and the first node in the connection graph associated with the design being a same device type;
comparing the interconnection codes associated with the respective first nodes;
in the event that the first interconnection codes are equal, identifying the first node in the connection graph stored in the database as a first design pattern; and
adding the first design pattern to a set of design patterns.

9. The method of claim 8, wherein comparing the connection graph further comprises:
selecting a second node in the connection graph stored in the database and a second node in the connection graph associated with the design, the second node in the connection graph stored in the database and the second node in the connection graph associated with the design being a same device type;
comparing the interconnection codes associated with the respective second nodes; in the event that the second interconnection codes are equal, identifying the second node in the connection graph stored in the database as a second design pattern;
adding the second design pattern to the set of design patterns; and
repeating the above steps for all nodes in all of the connection graphs stored in the database and in the connection graph associated with the design.

10. The method of claim 9, wherein comparing the connection graph further comprises:
transforming the second interconnection codes to corresponding terminal connection indices; and
deriving a set of terminal connections associated with a node by mapping each terminal connection index to a corresponding terminal connection.

11. The method of claim 9, wherein comparing the connection graph further comprises:
reducing the set of design patterns to a set of vertices representing design patterns common to the existing connection graph and the target connection graph;
generating a pattern graph from the set of vertices;
dividing the pattern graph into a plurality of groups each having a maximal independent set of vertices;
hierarchically merging two of the groups while maintaining a maximum reusability of a legacy layout;
repeating the hierarchically merging until a single group is obtained to generate the layout of the design.

12. The method of claim 11, wherein reducing the set of design patterns to the set of vertices comprises:
in the event that the set of vertices comprises two vertices having no interconnection, eliminating one of the two vertices that has a lower reusability index.

13. The method of claim 11, reducing the set of design patterns to the set of vertices further comprises, in the event that the single group comprises a plurality of vertices:
selecting the one having the highest reusability index as the target layout.

14. The method of claim 13, further comprising:
migrating the layout to a target technology;
verifying the migrated layout; and
storing the verified layout and associated schematics/netlists in the database.

15. A non-transitory computer readable storage medium comprising instructions which when executed by a processor cause the processor to:
receive a schematic representation of the design in one or more computer readable media, the schematic representation comprising a plurality of devices and associated terminals coupled to one another by a plurality of nets;
generate a connection graph associated with the schematic representation of the design, the instructions for generating the connection graph causing the processor to:
calculate interconnection codes between pairs of devices;
convert the devices and nets connecting the terminals to respective nodes and edges; and
associate the interconnection codes to the edges of the connection graph;
compare the connection graph to a plurality of connection graphs stored in a database to identify a match; and
select a layout associated with the matching connection graph in generating the layout of the design.

16. The computer readable storage medium of claim 15, wherein the instructions further cause the processor to:
migrate the identified pattern to a new technology;
verify the migrated pattern; and
update the database with the verified pattern.

17. The computer readable storage medium of claim 15, wherein an interconnection code between a pair of devices is a sum of values of terminal connection indices between the terminals of the pair of device.

18. The computer readable storage medium of claim 17, wherein the values of the terminal connection indices are powers of 2.

19. The computer readable storage medium of claim 15, wherein the instructions causing the processor to generate the connection graph further causing the processor to:
extract symmetry and proximity constraints from the existing design;
annotate the symmetry and proximity constraints in the connection graph.

20. The computer readable storage medium of claim 19, wherein the instructions causing the processor to generate the connection graph further causing the processor to:
tag device types on the nodes.

21. The computer readable storage medium of claim 20, wherein the instructions causing the processor to compare the connection graph further causing the processor to:
select a connection graph of the connection graphs stored in the database;
select a first node in the connection graph stored in the database and a first node in the connection graph associated with the design, the first node in the connection graph stored in the database and the first node in the connection graph associated with the design being a same device type;
compare the interconnection codes associated with the respective first nodes;
in the event that the first interconnection codes are equal, identify the first node in the connection graph stored in the database as a first design pattern; and add the first design pattern to a set of design patterns.

22. The computer readable storage medium of claim 21, wherein the instructions causing the processor to compare the connection graph further causing the processor to:
   select a second node in the connection graph stored in the database and a second node in the connection graph associated with the design, the second node in the connection graph stored in the database and the second node in the connection graph associated with the design being a same device type;
   compare the interconnection codes associated with the respective second nodes;
   in the event that the second interconnection codes are equal, identify the second node in the connection graph stored in the database as a second design pattern;
   add the second design pattern to the set of design patterns; and
   repeat the above steps for all nodes in all of the connection graphs stored in the database and in the connection graph associated with the design.

23. The computer readable storage medium of claim 22, wherein the instructions causing the processor to compare the connection graph further causing the processor to:
   transform the second interconnection codes to corresponding terminal connection indices; and
   derive a set of terminal connections associated with a node by mapping each terminal connection index to a corresponding terminal connection.

24. The computer readable storage medium of claim 22, wherein the instructions causing the processor to compare the connection graph further causing the processor to:
   reduce the set of design patterns to a set of vertices representing design patterns common to the existing connection graph and the target connection graph;
   generate a pattern graph from the set of vertices;
   divide the pattern graph into a plurality of groups each having a maximal independent set of vertices;
   hierarchically merge two of the groups while maintaining a maximum reusability of a legacy layout;
   repeat the hierarchically merging until a single group is obtained to generate the layout of the design.

25. The computer readable storage medium of claim 22, wherein reduce the set of design patterns to the set of vertices comprises:
   in the event that the set of vertices comprises two vertices having no interconnection, eliminate one of the two vertices that has a lower reusability index.

26. The computer readable storage medium of claim 22, wherein the instructions causing the processor to compare the connection graph further causing the processor to:
   select the one having the highest reusability index as the layout;
   migrate the layout to a new technology;
   verify the migrated layout; and
   store the verified layout and associated schematics/netlists in the database.

27. A computer system configured to:
   receive a schematic representation of the design, the schematic representation comprising a plurality of devices and associated terminals coupled to one other by a plurality of nets;
   generate a connection graph associated with the schematic representation of the design by;
      calculating interconnection codes between pairs of devices;
      converting the devices and nets connecting the terminals to respective nodes and edges; and
      associating the interconnection codes to the edges of the connection graph;
   compare the connection graph to the plurality of connection graphs stored in the database to identify a match; and
   select a layout associated with the matching connection graph in generating the layout of the design.

28. The system of claim 27, wherein the system is further configured to:
   migrate the identified pattern to a new technology;
   verify the migrated pattern; and
   update the database with the verified pattern.

29. The system of claim 27, wherein an interconnection code between a pair of devices is a sum of values of terminal connection indeices between the terminals of the pair of devices.

30. The system of claim 29 wherein the values of the terminal connection indices are powers of 2.

31. The system of claim 27, wherein the system is further configured to:
   extract symmetry and proximity constraints from the existing design;
   annotate the symmetry and proximity constraints in the connection graph.

32. The system of claim 31, wherein the system is further configured to:
   tag device types on the nodes.

33. The system of claim 32, wherein the system is further configured to:
   select a connection graph in the plurality of connection graphs stored in the database;
   select a first node in the selected connection graph and a first node in the connection graph associated with the database, the first node in the selected connection graph and the first node in the connection graph associated with the design being a same device type;
   compare the interconnection codes associated with the respective first nodes;
   in the event that the first interconnection codes are equal, identify the first node in the selected connection graph as a first design pattern; and
   add the first design pattern to a set of design patterns.

34. The system of claim 33, wherein the system is further configured to:
   select a second node in the selected connection graph and a second node in the connection graph associated with the design, the second node in the selected connection graph and the second node in the connection graph associated with the design being a same device type;
   compare the interconnection codes associated with the respective second nodes;
   in the event that the second interconnection codes are equal, identify the second node in the selected connection graph as a second design pattern;
   add the second design pattern to the set of design patterns; and
   repeat the above steps for all nodes in all of the connection graphs stored in the database and in the connection graph associated with the design.

35. The system of claim 34, wherein the system is further configured to:
   transform the second interconnection codes to corresponding terminal connection indices; and
   derive a set of terminal connections associated with a node by mapping each terminal connection index to a corresponding terminal connection.

36. The system of claim 34, wherein the system is further configured to:
- reduce the set of design patterns to a set of vertices representing design patterns common to the existing connection graph and the target connection graph;
- generate a pattern graph from the set of vertices;
- divide the pattern graph into a plurality of groups each having a maximal independent set of vertices;
- hierarchically merge two of the groups while maintaining a maximum reusability of a legacy layout;
- repeat the hierarchically merging until a single group is obtained to generate the layout of the design.

37. The system of claim 34, wherein the system is further configured to:
- in the event that the set of vertices comprises two vertices having no interconnection, eliminate one of the two vertices that has a lower reusability index.

38. The system of claim 33, wherein the system is further configured to:
- select the one having the highest reusability index as the layout of the design; migrate the layout of the design to a new technology;
- verify the migrated layout; and
- store the verified layout and associated schematics/netlists in the database.

* * * * *